United States Patent
Candela

(10) Patent No.: US 10,690,185 B2
(45) Date of Patent: Jun. 23, 2020

(54) PISTON COOLING CRANKSHAFT

(71) Applicant: GM Global Technology Operations LLC, Detroit, MI (US)

(72) Inventor: Giorgio Candela, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 24 days.

(21) Appl. No.: 16/168,339

(22) Filed: Oct. 23, 2018

(65) Prior Publication Data

US 2020/0124094 A1    Apr. 23, 2020

(51) Int. Cl.
*F16C 3/16*    (2006.01)
*F16C 33/10*    (2006.01)
*F16C 9/02*    (2006.01)

(52) U.S. Cl.
CPC ............ *F16C 33/1065* (2013.01); *F16C 3/16* (2013.01); *F16C 9/02* (2013.01); *F16C 2360/22* (2013.01)

(58) Field of Classification Search
CPC .......... F16C 33/1065; F16C 3/16; F16C 9/02; F16C 2360/22
See application file for complete search history.

(56) References Cited

U.S. PATENT DOCUMENTS 6,098,577 A * 8/2000 Wu ........................... F01P 3/08
                                                            123/196 R

* cited by examiner

*Primary Examiner* — Jacob M Amick
(74) *Attorney, Agent, or Firm* — Cantor Colburn LLP

(57) ABSTRACT

A crankshaft including a plurality of journals, a plurality of crank pins; and a plurality of crank webs connecting select ones of the plurality of journals with select ones of the plurality of crank pins. One or more of the plurality of crank webs includes at least one radially outwardly exposed surface a plurality of cooling features formed thereon.

13 Claims, 3 Drawing Sheets

PISTON COOLING CRANKSHAFT

INTRODUCTION

The subject disclosure relates to the art of motor vehicles and, more particularly, to a motor vehicle including an internal combustion engine having a piston cooling crankshaft.

Internal combustion engines (ICE) rely on pistons to drive a crankshaft coupled to a fly wheel. The flywheel is typically mechanically connected to drive one or more vehicle wheels through a transmission. The piston travels in a cylinder and is driven by products of combustion created by ignition of a fuel such as gasoline, diesel fuel, and the like. The products of combustion create heat that is absorbed by many components of the ICE, including the pistons. Given the exposure to heat, pistons are typically formed from materials that conduct heat, such as aluminum.

Currently, manufacturers are using higher strength materials in forming pistons. The higher strength materials, such as steel, stand up to higher engine loading requirements imposed by, for example, start/stop systems, selective cylinder disabling systems, and the like. While possessing properties that are desirable to withstand higher stress, the higher strength materials also have a lower heat conductivity. The lower heat conductivity makes heat removal more difficult using conventional cooling systems. Accordingly, it is desirable to provide a system for removing heat from pistons, particularly those pistons formed from materials having a lower heat conductivity than aluminum.

SUMMARY

Disclosed is a crankshaft including a plurality of journals, a plurality of crank pins; and a plurality of crank webs connecting select ones of the plurality of journals with select ones of the plurality of crank pins. One or more of the plurality of crank webs includes at least one radially outwardly exposed surface a plurality of cooling features formed thereon.

In addition to one or more of the features described above or below, or as an alternative, further embodiments could include wherein the plurality of cooling features is defined by a plurality of grooves formed in the at least one radially outwardly exposed surface.

In addition to one or more of the features described above or below, or as an alternative, further embodiments could include wherein the grooves extend parallel to an axis of rotation of the crankshaft.

In addition to one or more of the features described above or below, or as an alternative, further embodiments could include wherein the at least one radially outwardly exposed surface includes a first radially outwardly exposed surface and a second, opposing radially outwardly exposed surface, the first radially outwardly exposed surface including a first plurality of cooling features formed thereon and the second radially outwardly exposed surface including a second plurality of cooling features formed thereon.

In addition to one or more of the features described above or below, or as an alternative, further embodiments could include wherein each of the plurality of grooves includes a width of between about 1 mm and about 3 mm.

In addition to one or more of the features described above or below, or as an alternative, further embodiments could include wherein each of the plurality of grooves includes a depth of between about 1 mm and about 3 mm.

In addition to one or more of the features described above or below, or as an alternative, further embodiments could include wherein a spacing between a first edge of one of the plurality of grooves and a first edge of an adjacent groove is between about 3 mm and about 5 mm.

Also disclosed is a motor vehicle including a vehicle body defining, at least in part, an occupant compartment, and an internal combustion engine mounted in the vehicle body. The internal combustion engine includes a crankshaft including a plurality of journals, a plurality of crank pins, and a plurality of crank webs connecting select ones of the plurality of journals with select ones of the plurality of crank pins. One or more of the plurality of crank webs include at least one radially outwardly exposed surface a plurality of cooling features formed thereon.

In addition to one or more of the features described above or below, or as an alternative, further embodiments could include wherein the plurality of cooling features is defined by a plurality of grooves formed in the at least one radially outwardly exposed surface.

In addition to one or more of the features described above or below, or as an alternative, further embodiments could include wherein the grooves extend parallel to an axis of rotation of the crankshaft.

In addition to one or more of the features described above or below, or as an alternative, further embodiments could include wherein the at least one radially outwardly exposed surface includes a first radially outwardly exposed surface and a second, opposing radially outwardly exposed surface, the first radially outwardly exposed surface including a first plurality of cooling features formed thereon and the second radially outwardly exposed surface including a second plurality of cooling features formed thereon.

In addition to one or more of the features described above or below, or as an alternative, further embodiments could include wherein each of the plurality of grooves includes a width of between about 1 mm and about 3 mm.

In addition to one or more of the features described above or below, or as an alternative, further embodiments could include wherein each of the plurality of grooves includes a depth of between about 1 mm and about 3 mm.

In addition to one or more of the features described above or below, or as an alternative, further embodiments could include wherein a spacing between a first edge of one of the plurality of grooves and a first edge of an adjacent groove is between about 3 mm and about 5 mm.

Further disclosed is a crankshaft for an internal combustion engine (ICE) including a plurality of crank webs, each having a first end, and a second end, and a plurality of cooling features formed on one of the first end and the second end.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
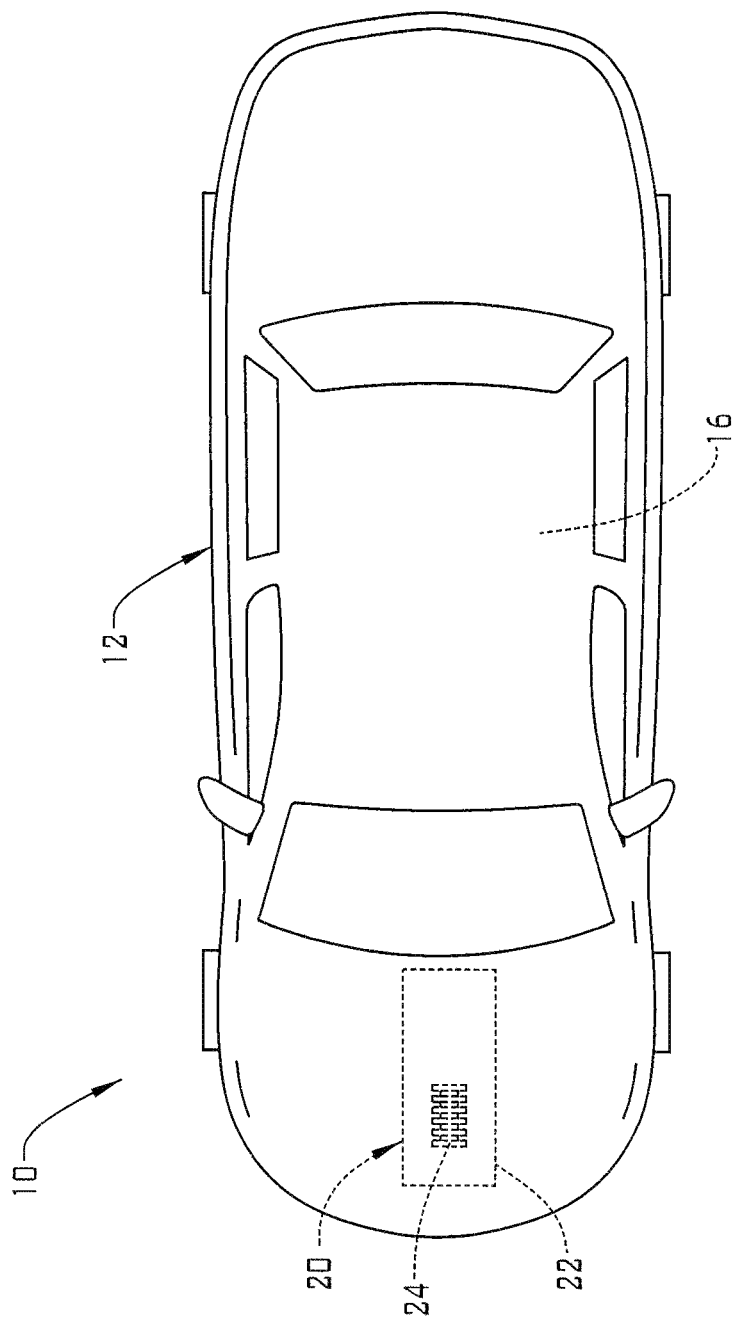
FIG. 1 is a top view of a motor vehicle including an internal combustion engine having a crankshaft, in accordance with an exemplary embodiment.

The following description is merely exemplary in nature and is not intended to limit the present disclosure, its application or uses. It should be understood that throughout the drawings, corresponding reference numerals indicate like or corresponding parts and features.

A motor vehicle, in accordance with an exemplary embodiment, is indicated generally at 10 in FIG. 1. Motor vehicle 10 includes a vehicle body 12 defining, at least in part, an occupant compartment 16. Vehicle body 12 also supports a prime mover 20 that takes the form of an internal combustion engine (ICE) 22. ICE 22 includes a number of pistons (not shown) that are formed from steel or other suitable material. ICE 22 also includes a crankshaft 24 that is designed to provide additional cooling to the pistons, as will be detailed herein.

Figure 2:
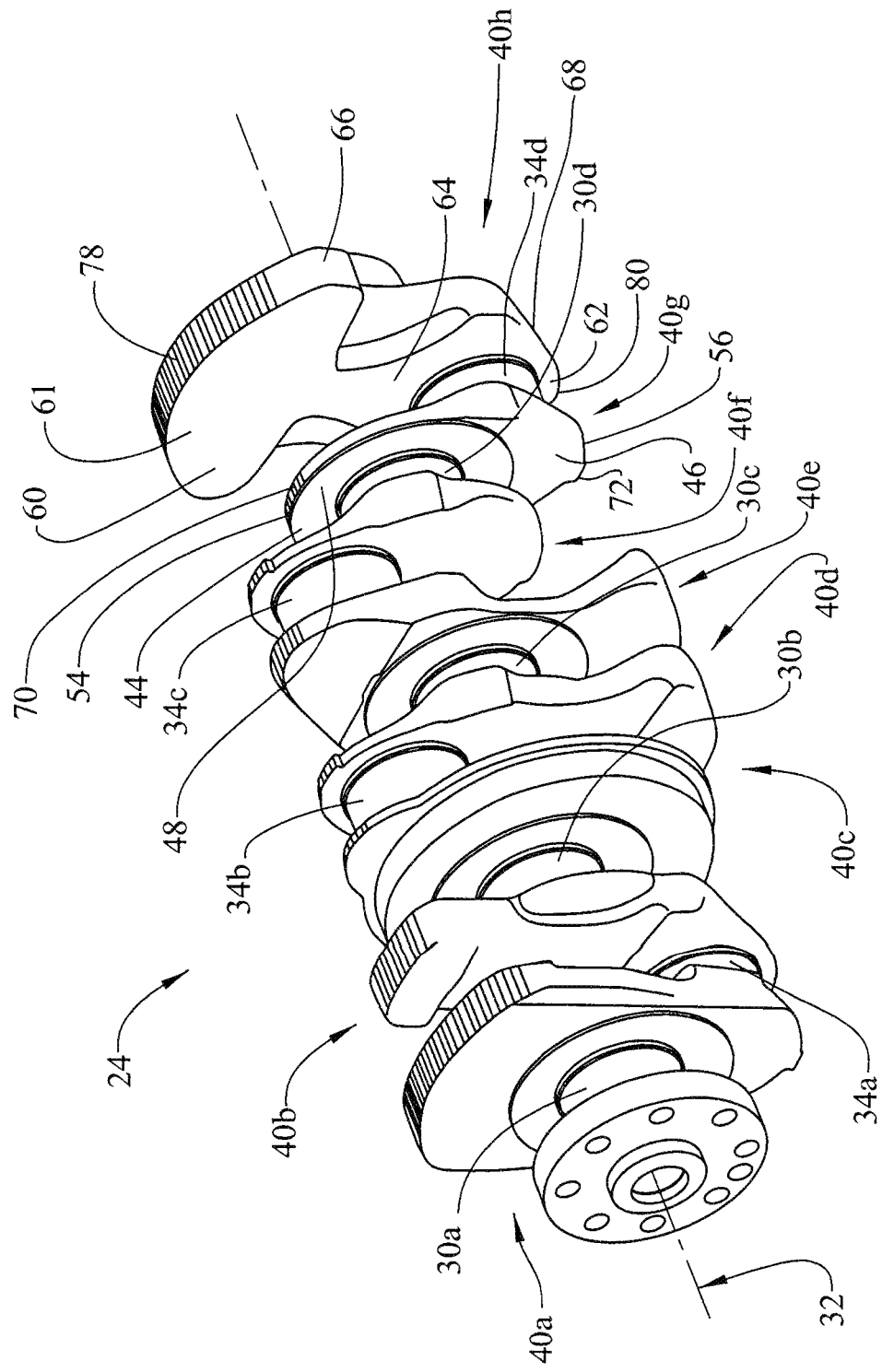
FIG. 2 is a perspective view of a crankshaft including cooling features, in accordance with an aspect of an exemplary embodiment.

Referring to FIG. 2, crankshaft 24 includes a plurality of main journals, four of which are indicated at 30a, 30b, 30c, and 30d. Main journals 30a-30d are coupled to an engine block (not shown) of ICE 22 through main bearings caps (also not shown). Main journals 30a-30d define an axis of rotation 32 of crankshaft 24. Crankshaft 24 also includes a plurality of crank pins 34a, 34b, 34c, and 34d that are connected to the steel pistons through connecting rods (not shown). A plurality of crank webs 40a, 40b, 40c, 40d, 40e, and 40h connect main journals 30a-30d and crank pins 34a-34d.

Reference will now follow to crank webs 40g and 40h with an understanding that crank webs 40a-40f may include similar structure. Crank web 40g includes a first end 44, a second end 46 and an intermediate portion 48 extending therebetween. First end 44 includes a first radially outwardly exposed surface 54 and a second end 46 includes a radially outwardly exposed surface 56. Crank web 40h includes a first end 60, which may define a counterweight 61, a second end 62, and an intermediate portion 64 extending therebetween. First end 60 includes a first radially outwardly exposed surface 66 and second end 62 includes a second radially outwardly exposed surface 68.

In accordance with an exemplary embodiment, crank web 40g includes a first plurality of cooling elements 70 arranged on first radially outwardly exposed surface 54 and a second plurality of cooling elements 72 arranged on second radially outwardly exposed surface 56. Crank web 40h includes a first plurality of cooling elements 78 arranged on first radially outwardly exposed surface 66 and a second plurality of cooling elements 80 arranged on second radially outwardly exposed surface 68. Cooling elements 70, 72 and 78, 80 take the form of grooves that extend parallel to axis of rotation 32.

Figure 3:
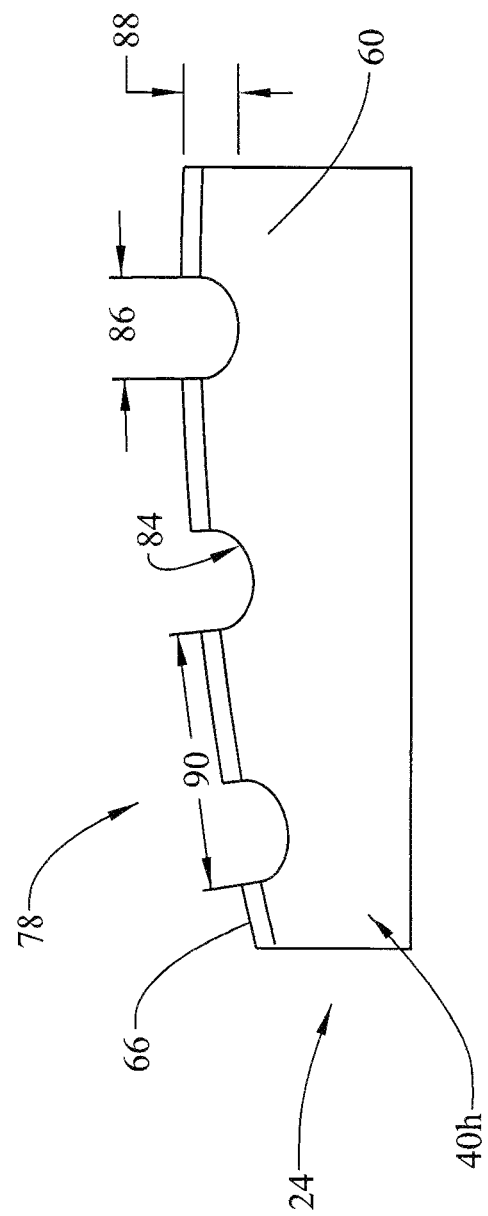
FIG. 3 is a partial side view of a crank web of the crankshaft of FIG. 2 depicting cooling features, in accordance with an aspect of an exemplary embodiment.

Reference will now follow to FIG. 3 in describing cooling elements 78 with an understanding that cooling elements 70, 72, and 80 may include similar structure. Cooling elements 78 take the form of grooves 84 that extend parallel to axis of rotation 32 (FIG. 2). Cooling elements 78 include a width 86 that is between about 1 mm and about 3 mm and a depth 88 that is between about 1 mm and 3 mm. Grooves 84 are spaced from one another a selected distance. A first edge (not separately labeled) of one of grooves 84 is spaced from a first edge (also not separately labeled) of a next, adjacent groove a distance 90 of between about 3 mm and about 5 mm. In operation, cooling elements 70, 72, and 78, 80 act as scoops that may capture an amount of oil in an oil pan (not shown) of ICE 22 and throw the amount of oil onto portions of the pistons as crankshaft 24 rotates. The oil reduces piston temperatures to increase component life and reduce maintenance cycles.

The terms "about" and "substantially" are intended to include the degree of error associated with measurement of the particular quantity based upon the equipment available at the time of filing the application. For example, "about" and "substantially" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A crankshaft comprising:
   a plurality of journals;
   a plurality of crank pins; and
   a plurality of crank webs connecting select ones of the plurality of journals with select ones of the plurality of crank pins, one or more of the plurality of crank webs including at least one radially outwardly exposed surface having a plurality of cooling features formed thereon, wherein the plurality of cooling features is defined by a plurality of grooves formed in the at least one radially outwardly exposed surface.

2. The crankshaft according to claim 1, wherein the grooves extend parallel to an axis of rotation of the crankshaft.

3. The crankshaft according to claim 1, wherein the at least one radially outwardly exposed surface includes a first radially outwardly exposed surface and a second, opposing radially outwardly exposed surface, the first radially outwardly exposed surface including a first plurality of cooling features formed thereon and the second radially outwardly exposed surface including a second plurality of cooling features formed thereon.

4. The crankshaft according to claim 1, wherein each of the plurality of grooves includes a width of between about 1 mm and about 3 mm.

5. The crankshaft according to claim 1, wherein each of the plurality of grooves includes a depth of between about 1 mm and about 3 mm.

6. The crankshaft according to claim 1, wherein a spacing between a first edge of one of the plurality of grooves and a first edge of an adjacent groove is between about 3 mm and about 5 mm.

7. A motor vehicle comprising:
a vehicle body defining, at least in part, an occupant compartment;
an internal combustion engine mounted in the vehicle body, the internal combustion engine including a crankshaft comprising:
a plurality of journals;
a plurality of crank pins; and
a plurality of crank webs connecting select ones of the plurality of journals with select ones of the plurality of crank pins, one or more of the plurality of crank webs including at least one radially outwardly exposed surface having a plurality of cooling features formed thereon, wherein the plurality of cooling features is defined by a plurality of grooves formed in the at least one radially outwardly exposed surface.

8. The motor vehicle according to claim 7, wherein the grooves extend parallel to an axis of rotation of the crankshaft.

9. The motor vehicle according to claim 7, wherein the at least one radially outwardly exposed surface includes a first radially outwardly exposed surface and a second, opposing radially outwardly exposed surface, the first radially outwardly exposed surface including a first plurality of cooling features formed thereon and the second radially outwardly exposed surface including a second plurality of cooling features formed thereon.

10. The motor vehicle according to claim 7, wherein each of the plurality of grooves includes a width of between about 1 mm and about 3 mm.

11. The motor vehicle according to claim 7, wherein each of the plurality of grooves includes a depth of between about 1 mm and about 3 mm.

12. The motor vehicle according to claim 7, wherein a spacing between a first edge of one of the plurality of grooves and a first edge of an adjacent groove is between about 3 mm and about 5 mm.

13. A crankshaft for an internal combustion engine (ICE) comprising:
a plurality of crank webs, each having a first end, and a second end; and
a plurality of cooling features formed on one of the first end and the second end, wherein the plurality of cooling features is defined by a plurality of grooves formed in the at least one radially outwardly exposed surface.

* * * * *